J. DEGENHARDT.
JOINT FOR CROSSING BARS.
APPLICATION FILED NOV. 5, 1908.
1,095,560.
Patented May 5, 1914.
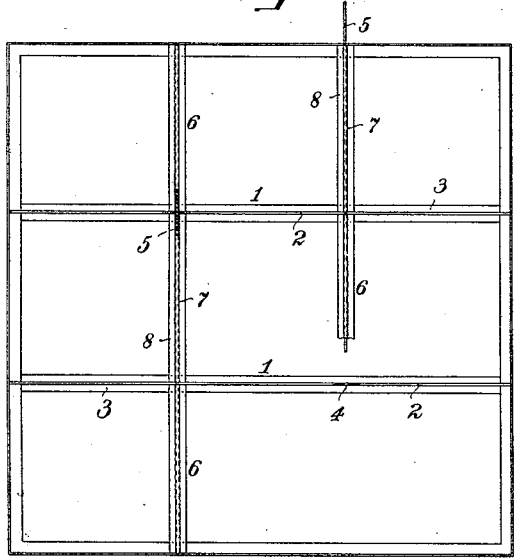
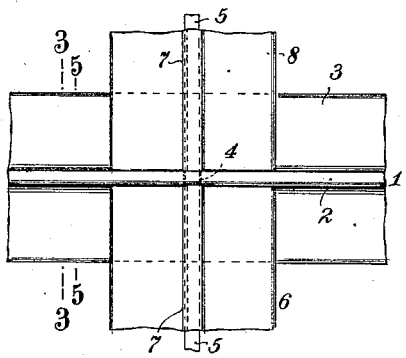
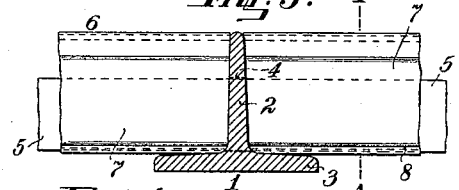
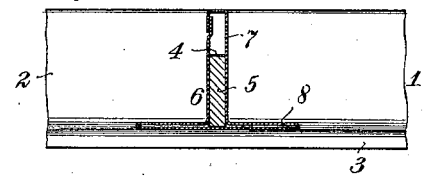
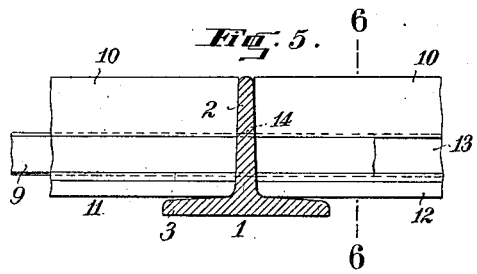
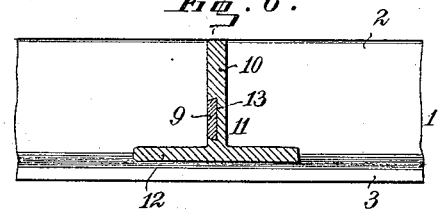
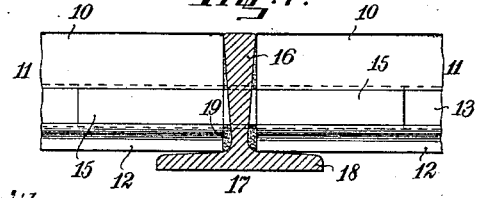

UNITED STATES PATENT OFFICE.

JOHANNES DEGENHARDT, OF TEMPELHOF, NEAR BERLIN, GERMANY.

JOINT FOR CROSSING BARS.

1,095,560.  Specification of Letters Patent.  Patented May 5, 1914.

Application filed November 5, 1908. Serial No. 461,167.

*To all whom it may concern:*

Be it known that I, JOHANNES DEGENHARDT, a citizen of the German Empire, residing at Tempelhof, near Berlin, Germany, have invented certain new and useful Improvements in Joints for Crossing Bars, of which the following is a full, clear, and exact description.

My invention relates to improvements in joints for crossing bars, and more particularly to joints for connecting bars composed to form grates or lattices for windows.

The object of the improvements is to provide a joint for crossing bars, whereby the bars can rapidly be jointed together to form grates or lattices for windows and the like, and which gives the grates or lattices so constructed a considerable strength.

A further object of the improvements is to so construct the joints, that an almost even bearing surface is produced on the upper sides of the flanges of the bars, whereby the window panes can conveniently be supported on the flanges of the bars.

With these objects in view, my invention consists of the elements described in the following specification and more particularly pointed out in the appended claims, reference being had to the accompanying drawings, in which—

Figure 1, is a plan of a partly composed window lattice embodying the invention, Fig. 2, is a plan on an enlarged scale showing in detail the joint of the bars forming the grate illustrated in Fig. 1, Fig. 3, is a vertical cross-section of the joint taken on the line 3—3 of Fig. 2, Fig. 4, is a vertical cross-section taken on the line 4—4 of Fig. 3, Fig. 5, is a vertical cross-section taken on the line 5—5 of Fig. 2 and illustrating a modification of the form of the flat iron bars and of the cross-stays, Fig. 6, is a cross-section taken on the line 6—6 of Fig. 5, Fig. 7, is a side view, partly in section, of a modification of the joint, and Fig. 8, is a plan illustrating a part of a grate embodying the joint illustrated in Fig. 7.

The same letters of reference have been used in all the views to indicate corresponding parts.

Referring particularly to the example illustrated in Figs. 1 to 4, the grate or lattice is composed of T-shaped longitudinal iron bars 1 extending over the whole length of the grate and of flat iron cross-bars 5 and T-shaped cross-stays 6. At the joints, the longitudinal bars 1 are provided above their flanges 3 with vertical slots 4 the height of which is preferably about two thirds of the height of the webs of the bars. The cross-bars 5 which are preferably made of rectangular cross-section have such dimensions that they fit loosely within the slots 4 of the bars 1, and their lengths are preferably equal to the breadth of the lattice. However, if the lattice is very broad, the flat iron bars 5 may be composed of several sections, in which case, however, the length of each section must be larger than the distance between two consecutive bars 1. Immediately above the flanges 8, the webs 7 of the cross-stays 6 are made hollow, and the said hollow part of the webs must be at least so high, that the flat iron bars 5 can be passed through the same, and the flanges 8 must be as thin as possible. For this purpose, the cross-stays 6 are made of sheet metal strips bent together into the form shown in Fig. 4. As appears from said figure, the flanges of each cross-stay are formed of two layers of thin sheet metal, while its web consists of a tube of rectangular cross-section. The length of the T-shaped cross-stays 6 is equal to the distance between two consecutive bars 1, so that, in the grate, the cross-stays abut against the webs 2 of the bars 1. When constructing the grate of the bars described, the bars 1 are placed within the proper distances one beside the other according to the lengths of the cross-stays 6. Now the cross-stays 6 are placed between the longitudinal bars 1 with their hollows registering with the slots 4 of the bars 1, whereupon the flat iron bars 5 are inserted through the slots 4 of the bars 1 and through the tubular cross-stays 6. By securing their ends, the bars 1 are rigidly connected to the T-shaped transverse bars 5 and 6. By reason of the flat iron bars extending through a plurality of bars 1, the lattice is made with a continuous connection also in a transverse direction, so that a considerable rigidity is obtained. By bending the cross-stays from sheet metal into the form of a T having a tubular section, the flanges can be made very thin, so that their surfaces are but slightly higher than those of the flanges of the bars 1. Thereby the window panes can easily be supported on the said flanges.

In Figs. 5 and 6, I have shown a modification of the grate in which the cross-bars consisting, in the previously described example, of flat iron and tubular sheet metal pieces, are made in a different way. In this example, the flat iron strips 9 are made with dove-tailed cross-sections, and within the web 10 of the cross-stays 11 a corresponding dove-tailed longitudinal groove 13 is made, which is located at one side of the web and preferably directly above the flange 12. The dove-tailed flat iron strips are slipped into the grooves made within the cross-stays 11, whereby a rigid connection is secured. The flange 12 of the cross-stays is made as thin as possible in the milling process; but it must be strong enough to securely bear the window pane supported thereon. Preferably, the form of the slots 14 within the web 2 corresponds to the cross-section of the flat iron strips 9, and the slots are located within such a distance above the flange 3, that the cross-stays 11 when slipped over the flat iron strips bear with their flanges 12 on the surface of the flanges 3 of the longitudinal bars 1. The grate can be constructed in the same way, as described with reference to the example illustrated in Figs. 1 to 4. Therefore, the dove-tailed flat iron strips 9 are inserted through the slots 14 of several longitudinal bars 1 after placing the cross-stays 11 between the latter.

The modification shown in Figs. 5 and 6 is preferable in this respect, that the flanges 12 of the T-shaped cross-stays can be made very thin, and the cross-stays as well as the flat iron strips can be manufactured on an ordinary rolling mill. Therefore the manufacture of the sectional cross-bars does not require special machines such as are necessary in the case of the example illustrated in Fig. 4, where such machines are necessary for bending the sheet metal strips into the form of the cross-stays 4.

The connection of the grate elements in the direction of the cross-stays 11 is rigid also in such cases in which the dove-tailed flat iron strips do not extend through several cross-stays, but where they are made of several sections each of which extends a certain distance into the dove-tailed groove of two adjacent cross-stays, as shown in Figs. 7 and 8. In this case, the flat iron strips 15 are separately pushed into the grooves 13 of the intermediate pieces 11.

If in the manufacture of window lattices the longitudinal bars 1 are in the shape of the ordinary T-bars made on the ordinary rolling mills and found on the market, the abutting faces of each of the cross-stays must be cut angular to the direction of the longitudinal axis of the same, and the lower surfaces of the flanges must be made rounded, in order to fit the form of the ordinary T-iron, the web portion of which is stronger near the flanges than at the outer end thereof, and which is made rounded at the corner connecting the web portion and the flange portion. When using T-bars of the form shown in Fig. 7, the cross-stays fit on the web of the longitudinal bars without having their abutting faces cut in the manner described. The web portion 16 of the bars 17, which are preferably made in the rolling mill, is made thinner near the flange portion thereof than at the outer margin, so that its cross-section is in the form of a dove-tail. The corner between the web 16 and the flange portion 18 can be rounded in such a way, that the rolling process is not thereby made more difficult.

By constructing the longitudinal bars as shown in Fig. 7, the center of gravitation of the bar is located nearer the edge of the web portion, so that the moment of resistance of the bar is increased.

When constructing the grate from the elements described and slipping the cross-stays 6 and 7 or 11 over the flat iron strips 5 or 9 or 15, until their faces abut against the webs 16 of the bars 17, a gap 19 is provided between both parts which is filled up by putty when putting in the window panes. Therefore, the abutting ends of the cross-stays bear with their flange portions against the flange portions 18 of the longitudinal bars 17, and with their web portions against the web portions 16 of the said bars, whereby a reliable connection of the parts is obtained in the direction of the cross-stays.

I claim:

1. In a joint for crossing bars, the combination with a continuous bar having a slot made in its web portion near its flange portion, said web portion being thicker at its outer margin than near the flange portion of the bar, of a T-shaped transverse piece, and a flat iron strip extending through said slot and within a hollow made in the web portion of said transverse piece.

2. The combination of a main bar having a flange and a web, a transverse bar engaging said web and having a flange adapted to extend over and rest upon the flange of the main bar, said main bar being provided with an opening extending transversely through its web and said transverse bar having a lengthwise extending recess formed in its web and adapted to register with said opening and a locking strip extending through said opening into said recess for locking said bars together.

3. In a lattice for windows and the like, the combination with continuous parallel flanged bars having registering slots in their web portions directly above their flange portions, of T-shaped cross-stays provided with recesses arranged between said bars, the recesses of said cross stays registering with said slots, said cross stays bearing with their flanges upon the flanges of said bars, and flat iron strips extending through said slots and into the recesses of said cross-stays.

4. The combination of a main bar having a flange and a web, a transverse bar engaging said web and having a flange adapted to extend over and rest upon the flange of the main bar, said main bar being provided with a transverse elongated opening in the web extending away from its flange toward the free edge of the web and said transverse bar having a lengthwise extending recess in its web adapted to register with said opening and a locking strip extending through said opening into said recess whereby said bars are locked together.

5. The combination of a main bar having a flange, a second bar projecting transversely from said main bar and having a flange bearing upon the flange thereof, said main bar being provided with an opening and said second bar having a dove-tail recess extending lengthwise thereof and adapted to register with said opening and a locking strip having a dove-tail shape in cross-section and adapted to extend through said opening into said recess whereby said bars are locked together.

6. In a joint for crossing bars, the combination of a continuous T-shaped bar provided in its web portion with a slot extended transversely through the same, transverse T-shaped sectional bars extending from opposite sides of said continuous bar and each provided in its web portion with a way extended longitudinally thereof, and a device extended from the way in the web on one side of the continuous bar through the transverse slot in the web of the latter into the way in the web on the opposite side of the continuous bar, substantially as described.

7. In a joint for crossing bars, in combination, a metallic member having a web portion and a flange extended therefrom, said web portion having an opening through it, a second metallic member having a web portion provided with a way extended longitudinally thereof and registering with the opening in the web of the first-mentioned member, and having a flange extended laterally from said web portion, and a device extended into said web and through said opening, for the purpose described.

8. In a lattice for windows and the like, in combination, a plurality of parallel continuous metallic members, each comprising a web portion having a plurality of openings through it spaced apart, and flanges extended on opposite sides of said web portion, a plurality of sectional metallic members, each comprising a web portion having a way extended longitudinally thereof and flanges extended on opposite sides of said web portion, the sectional members being arranged between the continuous members with their opposite ends supported by the adjacent flanges of two parallel continuous members and with the longitudinal ways in their web portions registering with openings in the web portions of said parallel members, and devices extended into the said longitudinal ways and through the openings in the webs of the continuous members, substantially as described.

In testimony whereof I hereunto affix my signature in the presence of two witnesses.

JOHANNES DEGENHARDT.

Witnesses:
HENRY HASPER,
WOLDEMAR HAUPT.

---

Copies of this patent may be obtained for five cents each, by addressing the "Commissioner of Patents, Washington, D. C."